(12) United States Patent
Dill et al.

(10) Patent No.: US 6,550,863 B2
(45) Date of Patent: Apr. 22, 2003

(54) VEHICLE SEAT HAVING AN INCLINATION-ADJUSTABLE SEAT CUSHION

(75) Inventors: Thomas Dill, Kaiserlautern (DE); Joachim Mühlberger, Obersülzen (DE)

(73) Assignee: Keiper GmbH & Co., Kaiserlautern (DE)

( * ) Notice: Subject to any disclaimer, the term of this patent is extended or adjusted under 35 U.S.C. 154(b) by 0 days.

(21) Appl. No.: 09/916,405

(22) Filed: Jul. 27, 2001

(65) Prior Publication Data

US 2002/0043847 A1 Apr. 18, 2002

(30) Foreign Application Priority Data

Jul. 29, 2000 (DE) .......................................... 100 37 327

(51) Int. Cl.[7] .................................................. A47C 1/02
(52) U.S. Cl. ........................ 297/322; 297/340; 297/313
(58) Field of Search ................................ 297/325, 277, 297/313, 340, 322, 327, 338

(56) References Cited

U.S. PATENT DOCUMENTS

| | | | | |
|---|---|---|---|---|
| 2,456,874 A | * | 12/1948 | Horner et al. ............... | 297/313 |
| 4,915,447 A | | 4/1990 | Shovar | |
| 5,024,484 A | * | 6/1991 | Buchasz ...................... | 297/300 |
| 5,193,880 A | * | 3/1993 | Keusch et al. ............... | 297/353 |
| 5,328,242 A | * | 7/1994 | Steffens et al. .............. | 297/374 |
| 5,810,440 A | * | 9/1998 | Unwalla ...................... | 297/316 |
| 5,868,469 A | * | 2/1999 | Ming ........................... | 297/338 |
| 6,053,575 A | | 4/2000 | Bauer et al. | |
| 6,334,648 B1 | * | 1/2002 | Girsberger et al. ....... | 297/216.1 |
| 6,340,208 B1 | * | 1/2002 | Habedank ................... | 297/322 |

FOREIGN PATENT DOCUMENTS

| | | |
|---|---|---|
| DE | 1 405 918 | 1/1969 |
| DE | 197 40 045 A1 | 3/1999 |
| DE | 197 54 962 C1 | 5/1999 |
| DE | 299 06 108 U1 | 8/1999 |

* cited by examiner

Primary Examiner—Peter M. Cuomo
Assistant Examiner—Stephanie Harris
(74) Attorney, Agent, or Firm—Alston & Bird LLP

(57) ABSTRACT

In the case of a vehicle seat, in particular a motor vehicle seat, having a seat frame (3), a seat shell (21) which is fitted to the seat frame (3) and bears a seat cushion (23), and an inclination adjuster (11) by means of which one part (19) of the seat frame (3) and/or of the seat shell (21) can be moved in order to adjust the inclination of the seat cushion (23), the seat shell (21) is fitted at one end to the movable part (19) of the seat frame (3) and at the other end is mounted on a fixed part (7) of the seat frame (3) in a manner such that it can be moved by means of a guide (29).

16 Claims, 2 Drawing Sheets

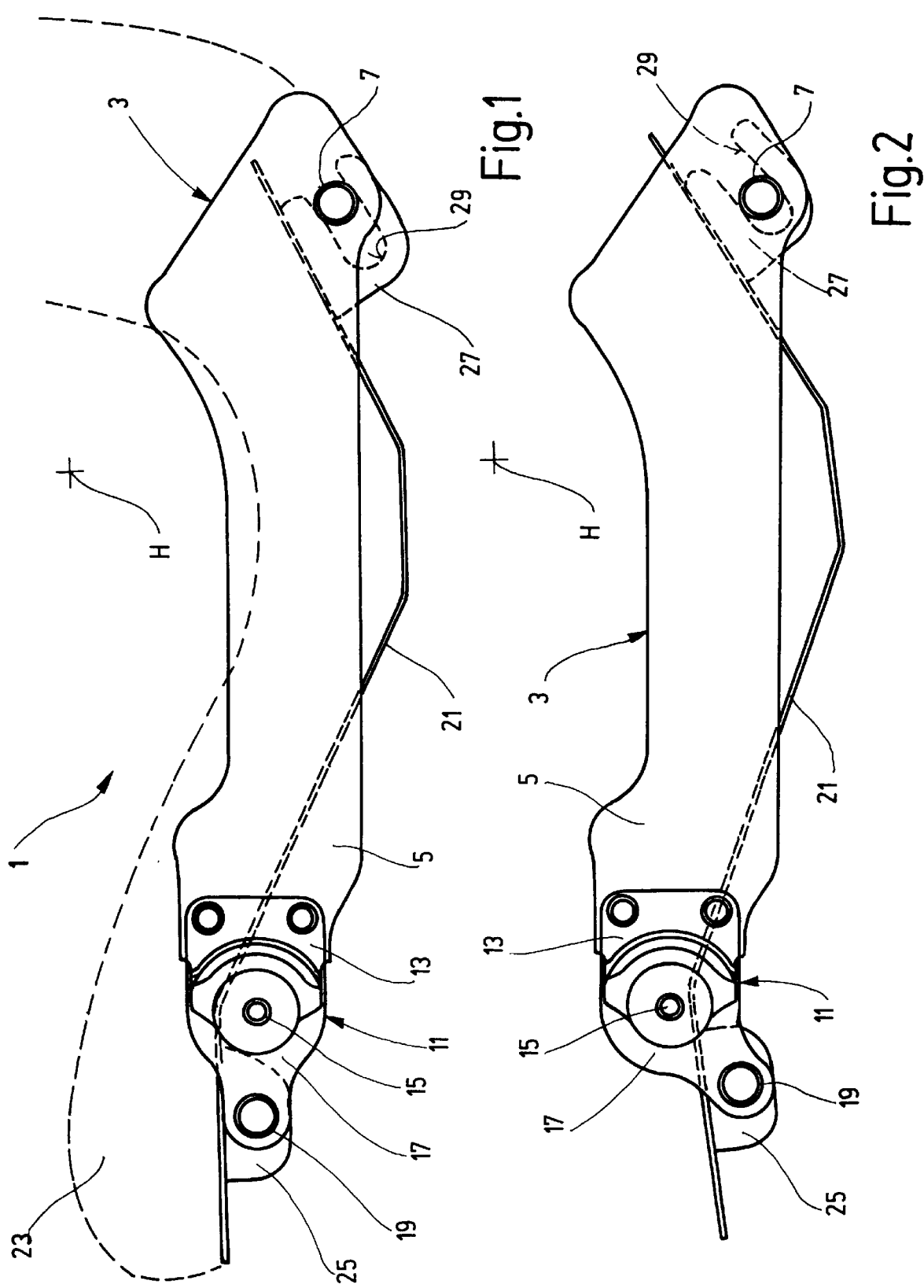

VEHICLE SEAT HAVING AN INCLINATION-ADJUSTABLE SEAT CUSHION

BACKGROUND OF THE INVENTION

The present invention relates to a vehicle seat, in particular a motor vehicle seat, having a seat frame, a seat shell which is fitted to the seat frame and bears a seat cushion, and an inclination adjuster by means of which one part of the seat frame and/or of the seat shell can be moved in order to adjust the inclination of the seat cushion.

In the case of a vehicle seat of type described above, a bolt is fitted to each side of the seat frame, in each case approximately below the hip point. The seat shell is mounted on these bolts by means of a rotary sliding joint which, during the adjustment of the inclination of the seat cushion, ensures rotation of the seat shell and displacement, as a means of adjusting it in the longitudinal direction of the vehicle seat.

SUMMARY OF THE INVENTION

One aspect of the present invention is the provision of improvements to vehicle seats of the type mentioned above.

In accordance with one aspect of the present invention, a vehicle seat, in particular a motor vehicle seat, includes an inclination adjuster that adjusts a seat cushion between inclinations by moving a movable part of a seat frame relative to a fixed part of the seat frame. The seat cushion is carried by a seat shell having an end connected to the movable part of the seat frame. As a result, the seat shell and the seat cushion move relative to the fixed part of the seat frame during the moving of the movable part of the seat frame. The other end of the seat shell is mounted to the fixed part of the seat frame, so that this other end of the seat shell moves relative to the fixed part of the seat frame via a guide, during the moving of the seat shell.

The production of the vehicle seat according to the invention is simplified and made less expensive by virtue of the fact that the seat shell is fitted at one end to the movable part of the seat frame and at the other end is mounted on a fixed part of the seat frame in a manner such that it can be moved by means of a guide. The fitting to the movable part of the seat frame replaces the rotary function of the rotary sliding joint, while the guide ensures longitudinal adjustment during the adjustment of the inclination. This design saves on the bolts and the rotary sliding joints.

An open design of the guide enables simpler installation, in which the seat shell is pushed or hooked on, for example to a rear transverse tube which is already present. By means of its shape, a cutout in the material of the guide can influence a prestressing force.

The guide is preferably shaped in such a manner that the hip point of a user of the vehicle seat remains virtually unchanged or is displaced only to a very slight extent during an adjustment of the inclination of the seat cushion. This reduces the actuating torque, relieves the inclination adjuster and its drive of load when the adjustment is undertaken by a motor, and increases the operating convenience when adjustment takes place manually. To this end, the guide may be slightly curved, for example, in which case the central point of the curvature can lie in the direction of or in the vicinity of the hip point. The hip point then forms, at least approximately, a type of pivot point for the movement of the seat shell.

The inclination adjuster can be arranged in such a manner that it only pivots the movable part of the seat frame downwards from a horizontal position. This range of adjustment likewise ensures that the hip point scarcely changes in its position during the adjustment of the inclination.

BRIEF DESCRIPTION OF THE DRAWINGS

Figure 3:
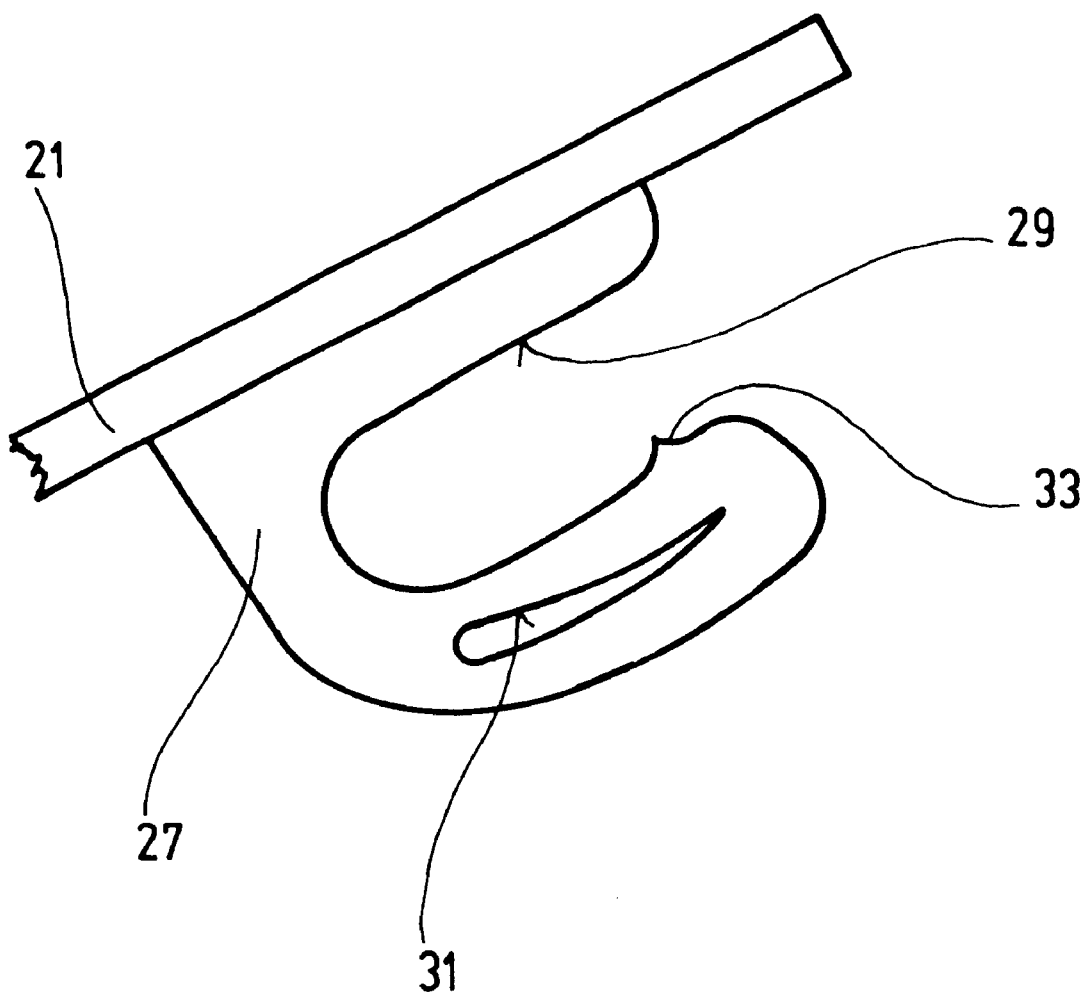

Having thus described the invention in general terms, the invention is explained in greater detail below with reference to an exemplary embodiment which is illustrated in the accompanying drawings, which are not necessarily drawn to scale, and wherein:

FIG. 1 shows a partial view of the exemplary embodiment with a steep inclination of the seat shell, with the seat cushion and back rest illustrated by broken lines, FIG. 2 shows a partial view corresponding to FIG. 1 with a flat inclination of the seat shell without the seat cushion and back rest, and FIG. 3 shows an enlarged partial view of the rear bearing.

DETAILED DESCRIPTION OF THE INVENTION

The present invention now will be described more filly hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will filly convey the scope of the invention to those skilled in the art.

A vehicle seat 1 for a motor vehicle has a seat framework (not illustrated) which bears a seat frame 3. The following directional data refer to the conventional arrangement of the vehicle seat 1, which is used, for example, as a driver's seat, in the motor vehicle and to the normal direction of travel thereof. The seat frame 3 has two seat-frame side parts 5 which are arranged on the left-hand side and right-hand side of the vehicle seat 1. The two seat-frame side parts 5 are connected fixedly to each other at their rear end by means of a rear transverse tube 7. The rear transverse tube 7 is arranged horizontally and transversely with respect to the direction of travel, i.e. it is perpendicular to the seat-frame side parts 5. A back rest (illustrated by broken lines in FIG. 1) is fitted to the seat frame 3 via fittings (not shown).

An inclination adjuster 11, which is designed as a double tumbling gear mechanism, is arranged at the front end of the left-hand seat-frame side part 5. The inclination adjuster 11 has a plate-shaped internal-geared framework 13 with which it is fitted to the seat-frame side part 5, a shaft 15 which is mounted in the internal-geared framework 13 and is arranged parallel to the rear transverse tube 7, and a likewise plate-shaped internal-geared output 17 which, driven by the shaft 15, can be pivoted relative to the internal-geared framework 13, the shaft 15 forming the pivot axis. A joint (not illustrated) whose pivot axis is aligned with the shaft 15 is provided at the front end of the right-hand seat-frame side part 5. The internal-geared output 17 and the corresponding joint arm on the other side of the vehicle seat 1 are connected fixedly to each other by a front transverse tube 19 which is arranged parallel to the rear transverse tube 7.

A seat shell 21, preferably made of plastic, aluminum or steel plate, bears a seat cushion 23 (illustrated by broken lines in FIG. 1). At its front end on its lower side, the seat shell 21 is fitted, for example is screwed or clipped, onto the front transverse tube 19 by means of a front bearing 25. At its rear end, the seat shell 21 has a rear bearing 27 which has a guide 29. The bearing 27 can consist of the same materials and, for example, can be clipped on as a separate part or can be integrally formed on it. The guide 29 is designed as a jaw-shaped receiving means which is open obliquely to the rear and at the top and at the same time as a slotted guide link which is open to the side and runs approximately in the longitudinal direction of the vehicle seat 1. The guide 29 accommodates the rear transverse tube 7, so that the seat shell 21 is mounted on the rear transverse tube 7 by means of the rear bearing 27. However, the rear transverse tube 7 is basically arranged in a movable manner within the guide 29, the guide 29 acting as a slotted guide link. Rattle-free mounting is ensured if the rear bearing 27 is formed from plastic and the guide 29 and the rear transverse tube 19 are suitably dimensioned.

Referring to FIG. 3, an elongated, wedge-shaped cutout 31, which is formed in the rear bearing 27 and runs virtually at a constant distance from the guide 29, tapers towards that end which is assigned to the open end of the guide 29. The cutout 31 ensures, over the length of the guide 29, a constant prestressing force which acts on the rear transverse tube 19. A lug 33, which is arranged in the region of the open end of the guide 29 and protrudes slightly into the interior of the guide 29, is used to produce a clip connection which closes after introduction of the rear transverse tube 19 and acts as a securing means.

In order to adjust the inclination of the seat cushion 23, the inclination adjuster 11 is driven by the shaft 15 and changes the height of the front transverse tube 19. As a result, the front end of the seat shell 21 is raised or lowered, while the rear end is moved less significantly. In the region of the rear end of the seat shell 21, a longitudinal adjustment is undertaken by means of the guide 29, by its component which points in the longitudinal direction of the vehicle seat, while the round profile of the rear transverse tube 19 enables rotary adjusting movements which may be necessary. The overall result is a change in the inclination of the seat cushion 23. The guide 29 is curved slightly upwards, so that the hip point H of a user of the vehicle seat 1 remains at a virtually unchanged height during the change of the inclination of the seat cushion 23. No additional lifting work then has to be performed, which relieves the load on the inclination adjuster 11 and its drive.

In order to install the vehicle seat 1, the seat shell 21 is first of all positioned on top over the front transverse tube 19, is pushed by its rear bearing 27 and the guide 29 thereof onto the rear transverse tube 7, and is then fitted from above on the front transverse tube 19.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiment disclosed and that modifications and other embodiments are intended to be included within the scope of the appended claims. Although specific terms are employed herein, they are used in a generic and descriptive sense only and not for purposes of limitation.

What is claimed is:

1. A vehicle seat for operating advantageously with respect to a hip point of a user of the vehicle seat, the vehicle seat comprising:
   a seat frame carried by a seat framework, the seat frame including a fixed part and a moveable part, wherein the moveable part is arranged at a front end of the seat frame and is pivotable relative to the fixed part;
   an inclination adjuster mounted for pivoting the movable part relative to the fixed part;
   a seat shell having a front end and a rear end, wherein a lower side of the front end of the seat shell is fitted onto a front transverse tube of the moveable part, and a lower side of the rear end is mounted on a rear transverse tube of the fixed part; and
   a seat cushion carried by the seat shell,
   wherein the inclination adjuster is for adjusting an inclination of the seat cushion by pivoting the movable part relative to the fixed part so that the seat shell and the seat cushion move relative to the fixed part during the movement of the movable part,
   wherein the rear end of the seat shell moves relative to the fixed part via a guide during the moving of the seat shell, the guide is formed by a rear bearing that is mounted on the lower side of the rear end of the seat shell, and the guide is positioned on the rear transverse tube,
   wherein the guide is shaped so that the hip point of the user of the vehicle seat remains substantially unchanged during the adjusting of the inclination of the seat cushion.

2. A vehicle seat according to claim 1, wherein the guide is curved slightly upwards.

3. A vehicle seat according to claim 2, wherein the guide is a partially open slotted guide link.

4. A vehicle seat according to claim 3, wherein the guide has a rearwardly orientated opening.

5. A vehicle seat according to claim 2, wherein the guide at least partially encloses the rear transverse tube of the fixed part of the seat frame.

6. A vehicle seat according to claim 2, wherein the rear bearing has a cutout positioned at a distance from the guide.

7. A vehicle seat according to claim 2, wherein the rear bearing has a lug that cooperates with the guide to provide a clip connection.

8. A vehicle seat according to claim 2, wherein the inclination adjuster moves the movable part between an upper position, in which the movable part is arranged in front of the inclination adjuster, and a lower position, in which the movable part is arranged obliquely below the inclination adjuster.

9. A vehicle seat according to claim 2, wherein the seat shell has, on its lower side, a front bearing which rests on and is connected to a front transverse tube of the movable part of the seat frame.

10. A vehicle seat according to claim 4, wherein the guide at least partially encloses the rear transverse tube of the fixed part of the seat frame.

11. A vehicle seat according to claim 6, wherein the guide at least partially encloses the rear transverse tube of the fixed part of the seat frame.

12. A vehicle seat according to claim 2, wherein the guide at least partially encloses a rear transverse tube of the seat frame, and the rear bearing has a lug that cooperates with the guide to provide a clip connection that connects the rear bearing to the rear transverse tube.

13. A vehicle seat according to claim 8, wherein the seat shell has, on its lower side, a front bearing which rests on and is connected to a front transverse tube of the movable part of the seat frame.

14. A vehicle seat according to claim 2, wherein a front end of the seat shell is mounted to a front transverse tube of the seat frame, and the inclination adjuster moves the front transverse tube to move the seat shell and the seat cushion relative to the rear transverse tube.

15. A vehicle seat according to claim 2, wherein the guide is a partially open slotted guide link having an opened end and a closed end.

16. A vehicle seat according claim 15, wherein to the open end of the guide has a rearwardly orientated opening.

* * * * *

UNITED STATES PATENT AND TRADEMARK OFFICE
CERTIFICATE OF CORRECTION

PATENT NO. : 6,550,863 B2
DATED : April 22, 2003
INVENTOR(S) : Dill and Joachim Mühlberger It is certified that error appears in the above-identified patent and that said Letters Patent is hereby corrected as shown below:

Title page,
Item [56], References Cited, U.S. PATENT DOCUMETNS, "Buchasz" should read -- Buchacz --.
Item [57], ABSTRACT,
Line 1, cancel "the case of"; cancel "vehicle";
Lines 1-2, cancel ", in particular a motor vehicle seat,";
Line 4, "means" should read -- way --.

Column 4,
Line 64, cancel "to".

Signed and Sealed this

Ninth Day of September, 2003

JAMES E. ROGAN
*Director of the United States Patent and Trademark Office*